United States Patent
Zhang et al.

(10) Patent No.: US 11,265,774 B2
(45) Date of Patent: Mar. 1, 2022

(54) APPARATUS AND MECHANISM TO IMPROVE MOBILITY ROBUSTNESS IN WIRELESS NETWORK

(71) Applicant: MediaTek Singapore Pte. Ltd., Singapore (SG)

(72) Inventors: Yuanyuan Zhang, Beijing (CN); Li-Chuan Tseng, Hsin-Chu (TW); Yung-Hsiang Liu, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/087,767

(22) Filed: Nov. 3, 2020

(65) Prior Publication Data
US 2021/0051537 A1 Feb. 18, 2021

Related U.S. Application Data

(63) Continuation of application No. PCT/CN2019/114600, filed on Oct. 31, 2019.

(51) Int. Cl.
*H04W 36/00* (2009.01)
*H04W 12/37* (2021.01)
(Continued)

(52) U.S. Cl.
CPC ....... *H04W 36/0061* (2013.01); *H04W 12/37* (2021.01); *H04W 36/0005* (2013.01);
(Continued)

(58) Field of Classification Search
CPC ......... H04W 36/0061; H04W 36/0079; H04W 36/0005; H04W 36/04; H04W 36/08; H04W 12/37; H04W 74/0833
(Continued)

(56) References Cited

U.S. PATENT DOCUMENTS

2018/0192347 A1 7/2018 Shaheen
2018/0279182 A1 9/2018 Sang et al.
(Continued)

FOREIGN PATENT DOCUMENTS

CN 101001460 A 8/2006
CN 108632926 A 3/2017
(Continued)

OTHER PUBLICATIONS

Taiwan IPO, office action for the TW patent application 108137223 (no English translation is available) dated Sep. 30, 2020 (6 pages).
(Continued)

*Primary Examiner* — Joel Ajayi
(74) *Attorney, Agent, or Firm* — Helen Mao; Zheng Jin; Imperium Patent Works

(57) ABSTRACT

Apparatus and methods are provided for handover robustness. In novel aspect, the UE receives a conditional handover (CHO) command from a source gNB containing a set of candidate cells with corresponding triggering conditions; detects a handover conditions for a target gNB belonging to the set of candidate cells; and performs HO procedure towards the target gNB. In one embodiment, the conditional HO command further configures a validity timer that controls a validity of handover conditions for the set of candidate cells. The validity timer is started upon receiving the conditional HO command, the validity timer is stopped upon detecting at least one events comprising a handover condition is met and a normal handover command is received, and the conditional HO command is set to be invalid upon the expiration of the validity timer.

12 Claims, 8 Drawing Sheets

(51) Int. Cl.
  *H04W 36/04* (2009.01)
  *H04W 36/08* (2009.01)
  *H04W 74/08* (2009.01)

(52) U.S. Cl.
  CPC ....... *H04W 36/0079* (2018.08); *H04W 36/04* (2013.01); *H04W 36/08* (2013.01); *H04W 74/0833* (2013.01)

(58) Field of Classification Search
  USPC .................................................. 455/436–448
  See application file for complete search history.

(56) References Cited

U.S. PATENT DOCUMENTS

| | | | |
|---|---|---|---|
| 2018/0279193 A1* | 9/2018 | Park | H04W 36/08 |
| 2019/0349819 A1 | 11/2019 | Xu et al. | |
| 2019/0373519 A1 | 12/2019 | Yiu et al. | |
| 2020/0022055 A1 | 1/2020 | Yan | H04W 36/30 |
| 2020/0045602 A1 | 2/2020 | Jiang | H04W 36/08 |
| 2020/0187069 A1 | 6/2020 | Hong | H04W 36/00 |

FOREIGN PATENT DOCUMENTS

| | | |
|---|---|---|
| CN | 107113673 A | 4/2017 |
| EP | WO2018085416 A1 | 11/2016 |
| EP | WO2018171582 A1 | 3/2018 |
| KR | 20180118047 A | 4/2017 |
| WO | WO2016108566 A1 | 12/2014 |
| WO | WO2017012228 A1 | 7/2015 |
| WO | WO2018085416 A1 | 11/2016 |
| WO | WO2018124761 A1 | 12/2016 |
| WO | WO2018144758 A1 | 2/2017 |
| WO | WO2018171582 A1 | 3/2017 |
| WO | WO2018144758 A1 | 2/2018 |

OTHER PUBLICATIONS

International Search Report and Written Opinion of International Search Authority for PCT/CN2019/114600 dated Jan. 21, 2020 (11 pages).

China National Intellectual Property Administration (CNIPA), office action for related Chinese patent application CN2019/80004279.1 dated Sep. 1, 2021.( 15 pages).

R2-1814194 3GPP TSG-RAN WG2 Meeting #103bis, Vivo. "Signaling procedure for conditional handover", Chengdu, China, Jun. 8-12, 2018 (4 pages).

R2-1815244 Meeting #103bis, ETRI "Signaling procedure for conditional handover", Chengdu, China, Jun. 8-12, 2018 "Considerations on Conditional Handover" (7 pages).

* cited by examiner

APPARATUS AND MECHANISM TO IMPROVE MOBILITY ROBUSTNESS IN WIRELESS NETWORK

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/114600, titled "Apparatus and Mechanism to improve mobility robustness in wireless network," with an international filing date of Oct. 31, 2019, which in turn claims priority from International Application No. PCT/CN2018/113124 filed on Oct. 31, 2018. This application is a continuation of International Application No. PCT/CN2019/114600, which claims priority from International Application No. PCT/CN2018/113124. International Application No. PCT/CN2019/114600 is pending as of the filing date of this application, and the United States is a designated state in International Application No. PCT/CN2019/114600. The disclosure of each of the foregoing documents is incorporated herein by reference.

TECHNICAL FIELD

The disclosed embodiments relate generally to wireless communication, and, more particularly, to improvement of mobility robustness in the wireless network.

BACKGROUND

In the current wireless communication network, handover procedure is performed to support mobility when UE moves among different cells. For example, in the current new radio (NR) system, only basic handover is introduced. The basic handover is mainly based on LTE handover (HO) mechanism in which network controls UE mobility based on UE measurement reporting. In the basic/normal handover, similar to LTE, the source gNB triggers handover by sending HO request to the target gNB. After receiving HO Request ACK from the target gNB, the source gNB initiates handover by sending HO command with target cell configuration.

Further, in addition to traditional voice and internet data services, the wireless network now needs to support many other services with various QoS requirements. For example, some services require ultra-reliability and low latency, such as remote control, aerial, industrial automation, industrial control, and Augmented Reality (AR) and Virtual Reality (VR). For such services, mobility performance with high reliability and low interruption time are required.

With the increased density of network deployment, the UE may experience more frequent handover due to the number of the cells and the radius of cells. compared to the LTE, the handover in high frequency range of the NR with beamforming may increase interruption time due to beam sweep delays. With smaller coverage, the beamforming also reduces the reliability of the wireless system. When the UE moves or rotates, the UE can experience very fast signal degradation. It may result in higher handover failure and high ping-pong rate. Therefore, handover becomes extremely challenging in high frequency environment than in low frequency. When handover failure or radio link failure (RLF) occurs, the UE needs to perform RRC connection re-establishment, which takes a long time and impairs the user experience dramatically. If RRC connection re-establishment fails, the UE will go to IDLE.

Improvements and enhancements are required for the mobility reliability and the reduction of handover failure rate and radio link failure rate.

SUMMARY

Apparatus and methods are provided for handover robustness. In novel aspect, the UE receives a conditional handover (CHO) command from a source gNB containing a set of candidate cells, wherein each candidate cell is a handover target cell when one or more corresponding handover conditions are verified; detects a handover conditions for a target gNB belonging to the set of candidate cells contained in the conditional HO command, wherein each candidate cell is configured with a corresponding handover condition; and performs a random access towards the target gNB. In one embodiment, the CHO command is carried by RRC reconfiguration message. In one embodiment, the UE performs a conditional HO in response to a conditional HO command in the RRC reconfiguration message, a normal HO in response to a normal HO command in the RRC reconfiguration message, and a reconfiguration in response to a regular RRC reconfiguration message. In one embodiment, the conditional HO command further configures a validity timer that controls a validity of handover conditions for the set of candidate cells. In one embodiment, the validity timer is started upon receiving the conditional HO command, the validity timer is stopped upon detecting at least one events comprising a handover condition is met and a normal handover command is received, and the conditional HO command is set to be invalid upon the expiration of the validity timer. In another embodiment, the conditional HO command further includes a candidate cell ID for each candidate cell, a new C-RNTI, one or more security algorithm identifiers for corresponding selected security algorithms for each candidate cell. In yet another embodiment, the conditional HO command further includes a set of dedicated random access channel (RACH) resources, an association between RACH resources and synchronization signal blocks (SSBs), an association between RACH resources and UE-specification channel state information-reference signal (CSI-RS) configurations, common RACH resources, and candidate cell system information blocks (SIBs). In one embodiment, the UE transmits a HO start indication message to the source gNB upon detecting at least one handover condition for a candidate cell is met.

In another novel aspect, a gNB receives a HO request from a source gNB, transmits HO request ACK message in response to the HO request to the source gNB, and performs an SN STATUS TRANSFER with the source gNB upon detecting one or more preconfigured conditions. In one embodiment, a validity timer is configured for the one or more preconfigured conditions. The gNB releases releasing UE context upon expiration of the validity timer. In another embodiment, the gNB receives an RRC reconfiguration message from the UE and connects with the UE as the target gNB. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
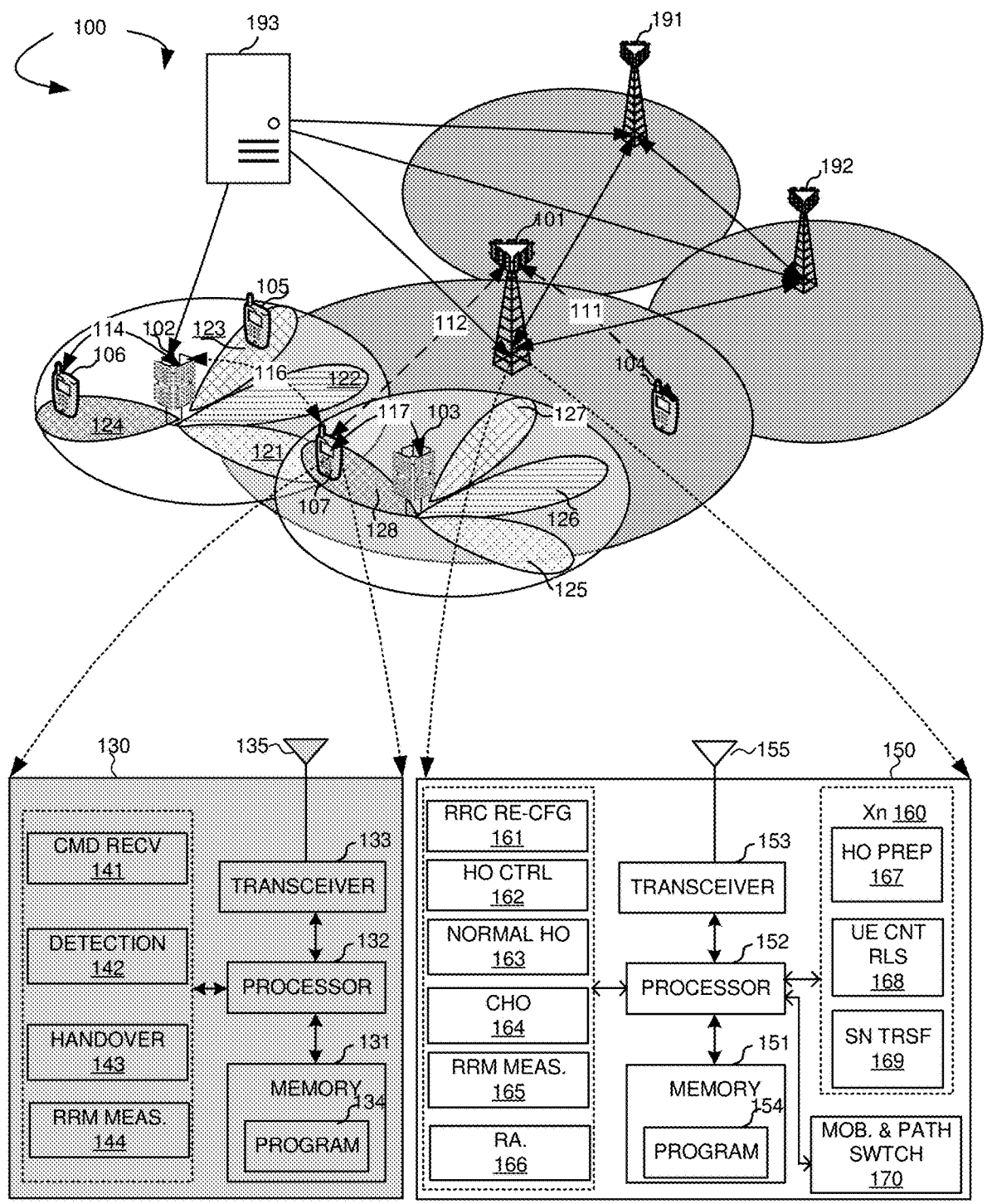
FIG. 1 is a schematic system diagram illustrating an exemplary wireless network with condition handover in accordance with embodiments of the current invention.

FIG. 1 is a schematic system diagram illustrating an exemplary wireless network 100 with condition handover in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, or by other terminology used in the art. The network can be homogeneous network or heterogeneous network, which can be deployed with the same frequency or different frequency. The frequency used to provide coverage can be on low frequency e.g. sub-6 GHz or on high frequency e.g. above-6 GHz. As an example, base stations (BSs) 101, 102, 103, 191 and 192 serve a number of mobile stations (MSs or UEs) 104, 105, 106 and 107 within a serving area, for example, a cell, or within a cell sector. In some systems, one or more base stations are coupled to a controller forming an access network that is coupled to one or more core networks. All the base stations can be adjusted as synchronous network, which means that that the transmission at the base stations are synchronized in time. On the other hand, asynchronous transmission between different base stations is also supported. The base station 101, 191, 192 are a macro base station, which provides large coverage. It is either a gNB or an ng-eNB, which providing NR user plane/E-UTRA and control plane protocol terminations towards the UE. The gNBs and ng-eNBs are interconnected with each other by means of the Xn interface, e.g. 175, 176 and 176. The gNBs and ng-eNBs are also connected by means of the NG interfaces, e.g. 172, 173 and 174 to the 5GC, more specifically to the AMF (Access and Mobility Management Function) by means of the NG-C interface and to the UPF (User Plane Function) by means of the NG-U interface. UE 104 is moving, which is originally served by gNB 101 through the radio link 111. The cell served by gNB 101 is considered as the serving cell. When UE 104 moves among different cells, the serving cell needs to be changed through handover (HO) and the radio link between the UE and the network changes. All other cells instead of the serving cell is considered as neighboring cells, which can either be detected by UE or configured by the network. Among those neighboring cells, one or multiple cells are selected by the network as candidate cells, which are potentially used as the target cell. The target cell is the cell towards which HO is performed. For example, if the cell of gNB 191 is considered as the target cell. After HO, the connection between UE and the network is changed from gNB 101 to gNB 191.

The gNB 102 and gNB 103 are base station, providing coverage of small cells. They may have a serving area overlapped with a serving area of gNB 101, as well as a serving area overlapped with each other at the edge. They can provide coverage through single beam operation or multiple beam operation. In multiple beam operation, the gNBs 102 and 103 may have multiple sectors each of which corresponds to multiple beam to cover a directional area. As shown in FIG. 1, Beams 121, 122, 123 and 124 are exemplary beams of gNB 102, while Beams 125, 126, 127 and 128 are exemplary beams of gNB 103. The coverage of the gNBs 102 and 103 can be scalable based on the number of TRPs radiate the different beams. For example, UE or mobile station 104 is only in the service area of gNB 101 and connected with gNB 101 via a link 111. UE 106 is connected with the HF network only, which is covered by beam 124 of gNB 102 and is connected with gNB 102 via a link 114. UE 105 is in the overlapping service area of gNB 101 and gNB 102. In one embodiment, UE 105 is configured with dual connectivity and can be connected with gNB 101 via a link 113 and gNB 102 via a link 115 simultaneously. UE 107 is in the service areas of gNB 101, gNB 102, and gNB 103. In embodiment, UE 107 is configured with dual connectivity and can be connected with gNB 101 with a link 112 and gNB 103 with a link 117. In embodiment, UE 107 can switch to a link 116 connecting to gNB 102 upon connection failure with gNB 103. Furthermore, all of the base stations can be interconnected with each other by means of the Xn interface. They can be also connected by means of the NG interfaces to the 5GC, more specifically to the AMF by means of the NG-C interface and to the UPF by means of the NG-U interface.

FIG. 1 further illustrates simplified block diagrams 130 and 150 for UE 107 and gNB 101, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver module 133 is an example, and in one embodiment, the RF transceiver module comprises two RF modules (not shown), first RF module is used for mmW transmitting and receiving, and another RF module is used for different frequency bands transmitting and receiving which is different from the mmW transceiving. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. A command receiving circuit 141 receives a conditional handover (HO) command from a source gNB, wherein the conditional HO command contains a set of candidate cells, and wherein each candidate cell is a handover target cell when one or more corresponding handover conditions are verified. A detection circuit 142 detects a handover conditions for a target gNB belonging to the set of candidate cells contained in the conditional HO command, wherein each candidate cell is configured with a corresponding handover condition. A HO circuit 143 performs a random access towards the target gNB. An RRM measurement modular 144 performs RRM measurement on DL signals e.g. SSB or CSI-RS for both serving cell and neighboring cells. The neighboring cells can be intra-frequency cell or inter-frequency cells. UE performs beam level and cell level RRM measurement with L3 filter.

Similarly, gNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. An RRC configuration provider 161 provides RRC configurations for normal HO, conditional HO and regular RRC configuration through RRC configuration message. Either full configuration or delta configuration can be performed. In case of conditional HO, it provides the one or more sets of conditions and each set of condition corresponds one candidate cell. It also provides security configuration for one or multiple candidate cells. A HO controller 162 controls the execution of the conditional HO and normal HO, i.e. when to perform conditional HO, normal HO and apply the regular RRC configuration. In one embodiment, if the measurement reports with the triggering event(s) configured for normal HO is received, the source gNB decides to perform normal HO; if the measurement reports with the triggering event(s) configured for the conditional HO is received, the source gNB decides to perform conditional HO. The source gNB selects the set of candidate cell for HO preparation based on the RRM measurement results and the cell loading of the neighboring cells. A normal HO controller 163 controls the normal HO procedure and transmits/receives the related signaling and RRC messages. It also controls the HO preparation modular 165 for the coordination with the neighboring cells. A conditional HO controller 164 controls the conditional HO procedure and transmits/receives the related signaling and RRC messages. It also controls the HO preparation modular 165 for the coordination with the neighboring cells. An RRM measurement storage 165 stores the RRM measurement results reported from the UE and associates the measurement results to the corresponding measurement configuration including the Measurement object ID, reporting configuration ID and the linkage between them by measurement ID. A random-access handler 166 handles random access procedure initiated by the UE and transmits/receives the required. gNB 101 also includes multiple function modules 160 for Xn interface that carry out different tasks in accordance with embodiments of the current invention messages/signaling required in the HO procedure. A HO Preparation modular 167 performs HO preparation procedure towards one or multiple candidate cells for normal HO and conditional HO. The Handover preparation procedure is initiated by the source gNB if it determines the necessity to initiate the handover via the Xn interface. A UE context-release modular 168 determines when to release UE context. An SN STATUS TRANSFER modular 169 transfers the uplink PDCP SN and HFN receiver status and the downlink PDCP SN and HFN transmitter status from the source to the target gNB during an Xn handover for each respective RBs for which PDCP SN and HFN status preservation applies. A mobility and path switching modular 170 controls Xn initiated HO and path switching procedure over the NG-C interface.

Figure 2:
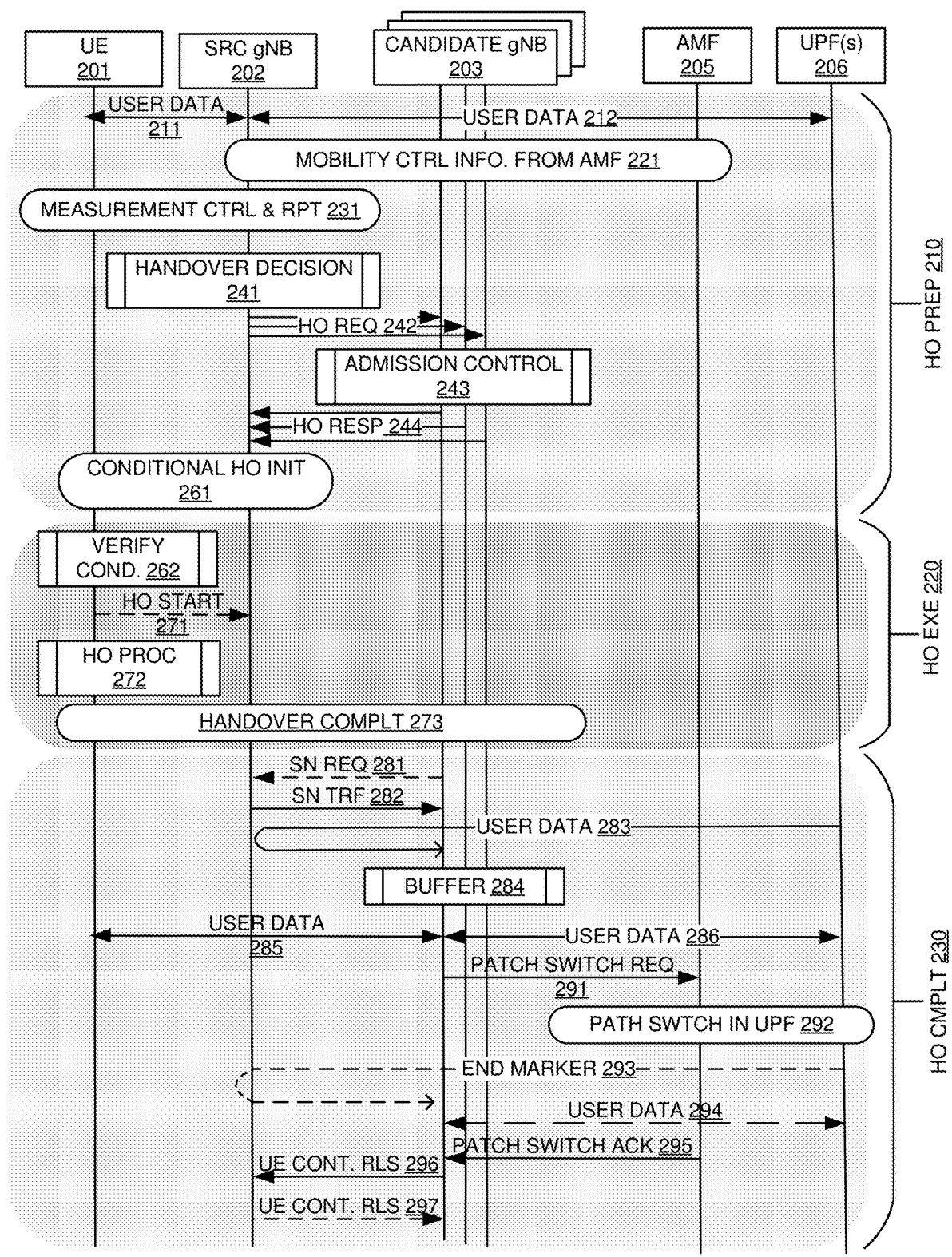
FIG. 2 illustrates an exemplary flow chart of the conditional handover procedure in accordance with embodiments of the current invention.

FIG. 2 illustrates an exemplary flow chart of the conditional handover procedure in accordance with embodiments of the current invention. UE 201 is connected with a source gNB 202 in a wireless network. Neighboring gNBs 203 communicates with source gNB 202. gNBs 203 are candidate cell gNBs. Source gNB 202 and candidate cell gNBs 203 are also connected by means of the NG interfaces. The gNBs are connected to the AMF 205 by means of the NG-C interface and to the UPF 206 by means of the NG-U interface. In one novel aspect, conditional handover is configured and performed. UE 201 establishes data path with user data 211 to source gNB 202, which establishes user data path 212 with the network. The conditional handover includes a HO preparation phase 210, a HO execution phase 220, and a HO completion phase 230.

HO preparation phase 210 includes configuration procedures, the handover decision procedure by source gNB 202, handover request and response message exchanges among source gNB 202 and candidate gNBs 203 and initiation of conditional HO (CHO). At step 221, source gNB 202 gets mobility control information from AMF 205. The UE context within the source gNB contains information regarding roaming and access restrictions, which were provided either at connection establishment or at the last time advance (TA) update. At step 231, UE 201 performs measurement control and report with source gNB 202. Source gNB 202 configures the UE measurement procedures and the UE reports according to the measurement configuration. In order support conditional HO procedure, triggering events with lower threshold will be configured to trigger early measurement reports. Based on the measurement reports from UE 201, at step 241, source gNB 202 determines whether to perform conditional HO or normal HO for UE 201. If step 241 determines CHO, source gNB 202 at step 242 issues one or multiple Handover Request messages to one or multiple candidate gNBs 203. At step 243, the candidate cell gNBs upon receiving HO Request from source gNB 202, performs admission control. At step 244, each candidate cell gNB sends HO Request ACK to source gNB 202. At step 261, source gNB 202 triggers the Uu handover by sending an RRCReconfiguration message to the UE.

In the HO execution phase 220, UE 201 monitors and verifies triggering conditions for each CHO candidate cell, performs HO procedures and completes the HO procedure with a target cell. At step 262, UE 201 monitors and verifies triggering events for each candidate cell based on the CHO command received. In one embodiment, optionally, upon detecting/verifying one or more triggering events for CHO with a candidate cell, UE 201 sends a HO start indication to source gNB 202. Upon verifying the triggering event for a candidate cell, at step 272, UE 201 performs HO procedure. The candidate cell that triggering event was detected becomes the target cell. UE 201 synchronizes to the target cell and performs handover procedure. At step 273, UE 201 completes the RRC handover procedure by sending RRCReconfigurationComplete message to target gNB.

HO complete phase 230 includes SN status transfer procedure, path switching procedures and UE context release procedures. In one embodiment, optionally, at step 281, target gNB sends the SN STATUS TRANSFER Request message to the source gNB. At step 282, source gNB sends the SN STATUS TRANSFER message to the target gNB. In another embodiment, step 282 can be performed earlier. For example, the SN STATUS TREANSFER message can be performed simultaneously when UE 201 performs random access procedure towards the target gNB. UE 201 establishes new data path 285 with target cell. New data path 286 is established between the target cell and the network. At step 291, target gNB sends a PATH SWITCH REQUEST message to AMF to trigger 5GC to switch the DL data path towards the target gNB and to establish an NG-C interface instance towards the target gNB. At step 292, path switch is performed in UPF. At step 293, 5GC switches the DL data path towards the target gNB. The UPF sends one or more "end marker" packets on the old path to the source gNB per PDU session/tunnel and then can release any U-plane/TNL resources towards the source gNB. At step 294, the data path between the new target cell and the network is established. At step 295, AMF 205 confirms the PATH SWITCH REQUEST message with the PATH SWITCH REQUEST ACKNOWLEDGE message. At step 296, upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue. At step 297, upon reception of the UE CONTEXT RELEASE, the source gNB also sends UE CONTEXT RELEASE to the candidate gNBs except the target gNB to release UE context. In one embodiment, the candidate gNB releases UE context if the UE did not perform random access towards it before the expiry of timer.

Figure 3:
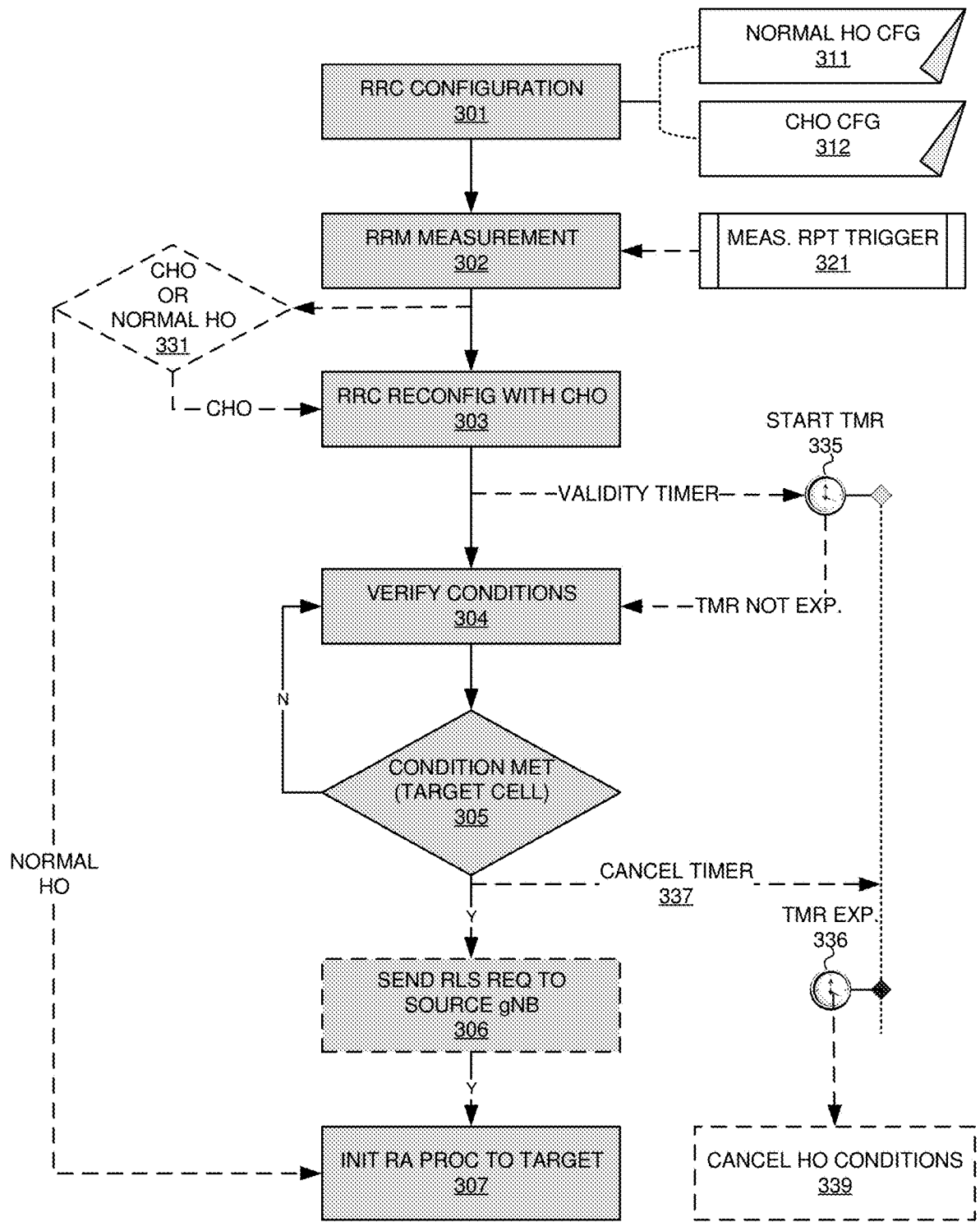
FIG. 3 illustrates exemplary diagrams of conditional handover procedure at the UE side over Uu interface in accordance with embodiments of the current invention.

FIG. 3 illustrates exemplary diagrams of conditional handover procedure at the UE side over Uu interface in accordance with embodiments of the current invention. At step 301, UE receives RRC Reconfiguration messages, which provides the RRM measurement configurations. In one embodiment, the RRC Reconfiguration includes sets of measurement configuration used for the purpose of normal HO 311 and another set of measurement configuration used for the purpose of conditional HO 312. At step 302, UE performs RRM measurement based on the configuration and sends measurement report to the network when the configured triggering event 321 in the measurement report configuration is satisfied. At step 331, the UE determines whether it is a normal HO or a conditional HO. If normal HO command is received, UE performs HO towards the target cell immediately by initiating the random-access (RA) procedure towards the target cell at step 307. If the UE receives conditional HO, at step 303, UE processes the CHO command. In one embodiment, the UE stores the triggering events/conditions for each corresponding candidate cell. At step 304, UE begins to verify and monitor the conditions of the candidate cell(s). At step 305, if the condition for at least one candidate cell is met, UE considers this candidate cell as the target cell to perform handover. In one embodiment, optionally, at step 306, UE sends the HO start indication message to the source cell indicating that UE will detach from the source cell and initiate the random-access procedure towards the target cell. In additional, the target cell identifier is also carried in the HO start indication message. At step 307, UE performs random access procedure towards the target cell. In one embodiment, UE apply the security configuration of the target gNB and transmits the RRC reconfiguration complete message to the target gNB. In one embodiment, the UE use a validity timer to control the validity period of the conditions of the candidate cells. At step 335, UE starts the timer upon receiving conditional HO command and begins to verity the conditions. Upon expiry of the validity timer at step 336, the UE release the stored conditions for the candidate cells in the conditional HO at step 339. At step 337, the UE stops the validity timer upon detecting triggering event for CHO. In one embodiment, the validity timer is cancelled when the UE sends the HO start indication message to the network. In another embodiment, the validity timer is cancelled when the UE initiates the random-access procedure towards the target cell. In yet another embodiment, the validity timer is cancelled when a normal HO command is received.

Figure 4:
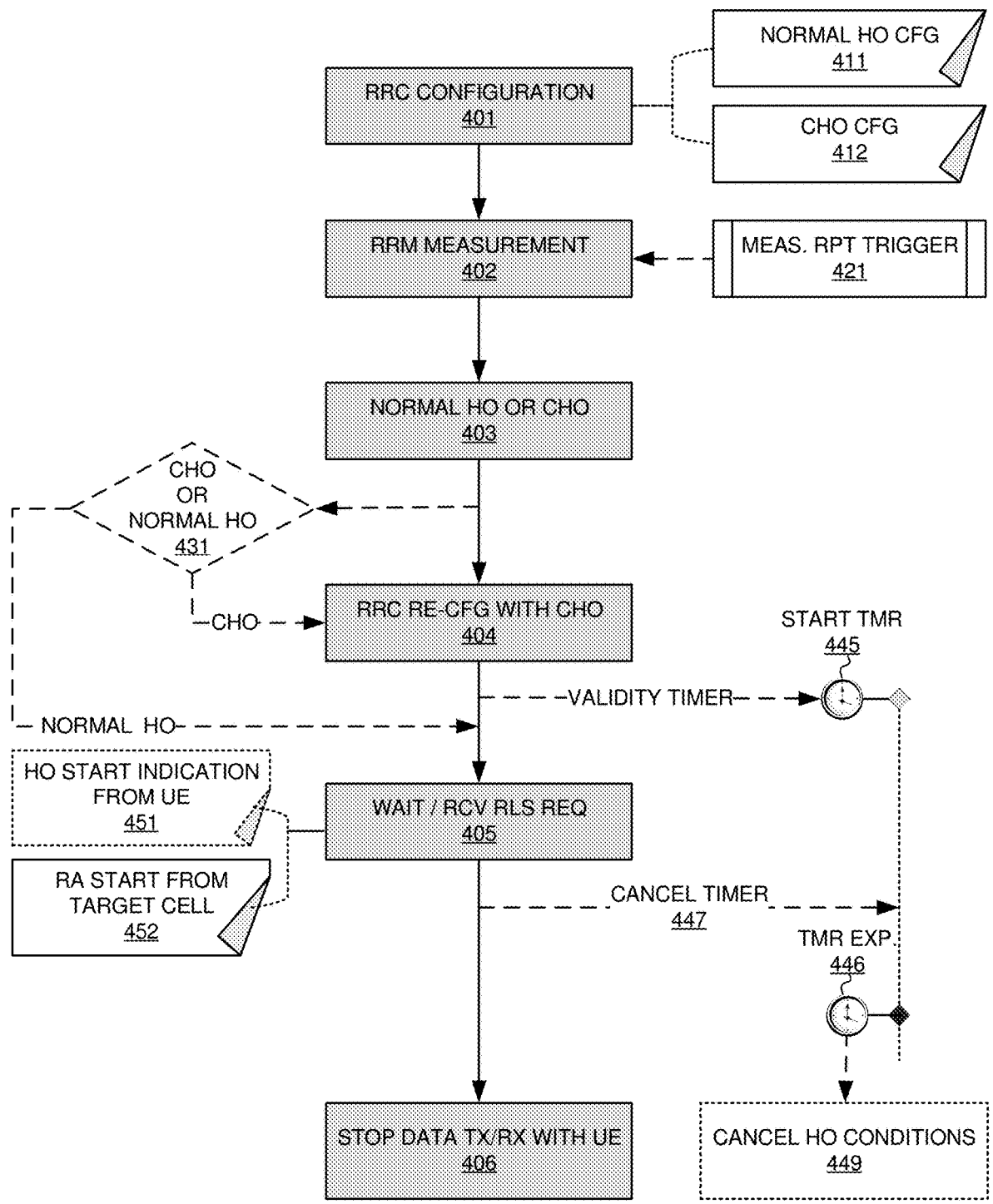
FIG. 4 illustrates exemplary diagrams of conditional handover procedure at the source gNB over Uu interface in accordance with embodiments of the current invention.

FIG. 4 illustrates exemplary diagrams of conditional handover procedure at the source gNB over Uu interface in accordance with embodiments of the current invention. At step 401, the source gNB provides RRC Reconfiguration message, which includes the RRM measurement configurations. It includes sets of measurement configuration used for the purpose of normal HO 411 and includes another set of measurement configuration used for the purpose of conditional HO 412. At step 402, the source gNB receives measurement report from the UE. In one embodiment, the measurement report is sent to the source gNB based on configured measurement report triggering events 421. At step 403, the source gNB determines whether to perform normal HO or conditional HO. If normal HO command is decided to be initiated, the source gNB performs handover preparation with the target gNB and send normal HO command to the UE and moves to step 405 to wait for the release request. If conditional HO is decided to be initiated, the source gNB performs handover preparation with one or multiple candidate gNBs and sends conditional HO command to the UE at step 404. At step 405, source gNB receives the HO start indication from the UE 451 or RA start 452 from a target cell. At step 406, the source gNB stops data transmission/reception with the UE. In one embodiment, the source gNB use a timer to control the validity period of the conditions of the target cells. At step 445, upon sending the CHO, the source gNB starts a source validity timer. At step 446, upon expiry of the source validity timer, the source gNB moves to step 449 and considers that the stored conditions for the candidate cells in the conditional HO is no longer valid. At step 447, the source gNB stops the timer when receives the HO start indication message from the UE, or when one of the candidate cells indicates that UE has initiated the RA procedure towards the target cell.

Figure 5:
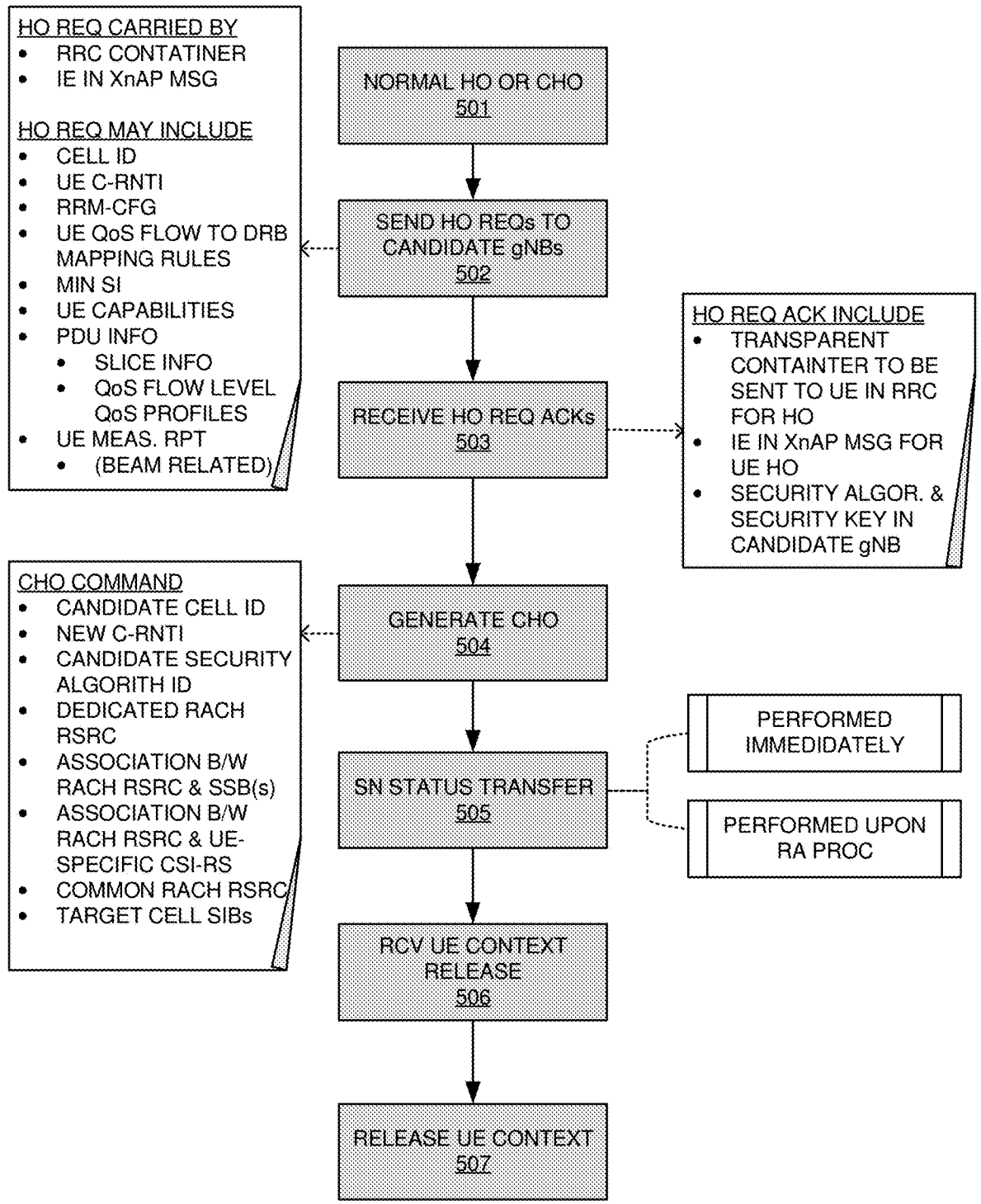
FIG. 5 illustrates exemplary diagrams of conditional handover procedure at the source gNB over Xn interface in accordance with embodiments of the current invention.

FIG. 5 illustrates exemplary diagrams of conditional handover procedure at the source gNB over Xn interface in accordance with embodiments of the current invention. At step 501, the source gNB determine whether to perform normal HO or conditional HO. If normal HO command is decided to be initiated, the source gNB sends handover request towards the target gNB. If conditional HO is decided to be initiated, at step 502, the source gNB sends handover request towards one or multiple candidate gNBs. In one embodiment, the source gNB passes one or multiple transparent RRC containers with necessary information to prepare the handover at the target sides. In other embodiment, the source gNB includes the necessary information to prepare the handover as information elements in XnAP messages. In another embodiment, the Handover Request messages sent to each candidate gNB includes the conditional HO indication, which informs the candidate gNBs to perform conditional HO. In one embodiment, each transparent RRC container is transmitted to one candidate gNB. In one embodiment, all the information except the information related to the candidate gNB are the same in the XnAP messages. In one embodiment, the information includes at least the target cell ID, KgNB*, the C-RNTI of the UE in the source gNB, RRM-configuration, the current QoS flow to DRB mapping rules applied to the UE, the minimum system information from source gNB, the UE capabilities for different RATS, PDU session related information, and can include the UE reported measurement information including beam-related information if available. The PDU session related information includes the slice information (if supported) and QoS flow level QoS profile(s). In another embodiment, the information only includes the part of the above information that is required for UE to perform access towards the target gNB. For example, it includes the target cell ID, KgNB*, the C-RNTI of the UE in the source gNB, RRM-configuration, the minimum system information from source gNB, the UE capabilities for different RATS, and UE reported measurement information. Other information is forwarded to the target gNB, towards which RA procedure initiated by the UE is successfully completed.

At step 503, if conditional HO is performed, the source gNB receives one or more HO request ACK from one or more candidate gNBs. In one embodiment, HANDOVER REQUEST ACKNOWLEDGE includes a transparent container to be sent to the UE as an RRC message to perform the handover. In another embodiment, HANDOVER REQUEST ACKNOWLEDGE includes necessary information as information element of XnAP message to be sent to the UE to perform the handover. In yet another embodiment, the HANDOVER REQUEST ACKNOWLEDGE includes the security algorithm and security key used in the candidate gNB.

At step 504, the source gNB generate the conditional HO considering the information received from the one or more candidate gNBs. In one embodiment, if the source gNB needs to comprehend the information from one more multiple HANDOVER REQUEST ACKNOWLEDGE received from different candidate gNBs and generate the RRCReconfiguration message considering the different candidate cells. In another embodiment, if the source gNB needs to comprehend the information in the transparent containers from one more multiple HANDOVER REQUEST ACKNOWLEDGE received from different candidate gNBs. In yet another embodiment, if the source gNB needs to comprehend the information in the information element from one more multiple HANDOVER REQUEST ACKNOWLEDGE received from different candidate gNBs. In one embodiment, RRCReconfiguration message information includes one or more sets of information required to access the candidate cells and each set of information corresponds to one candidate cell. In addition, RRCReconfiguration message configures a timer, which is used to control the validity of the condition. In another embodiment, RRCReconfiguration message information includes one or more sets of information required to access the candidate cells and each set of information corresponds to one candidate cell. In addition, RRCReconfiguration message configures a timer, which is used to control the validity of the condition. In one embodiment, the information set for each candidate cell includes: at least the candidate cell ID, the new C-RNTI, the candidate gNB security algorithm identifiers for the selected security algorithms. It can also include a set of dedicated RACH resources, the association between RACH resources and SSB(s), the association between RACH resources and UE-specific CSI-RS configuration(s), common RACH resources, and target cell SIBs, etc. In yet another embodiment, conditional HO command provides the validity timer to the UE to control the validity of the CHO conditions.

At step 505, the source gNB performs SN status transfer procedure. In one embodiment, the SN status transfer procedure is initiated upon reception of the SN status transfer request from one of the candidate gNB; in one embodiment, the SN status transfer procedure is initiated upon reception of the HO start indication message from the UE side. At step 506, the source gNB receives UE context release. At step 507, the source gNB release UE context upon reception of the UE context release message from the target gNB in step 506.

Figure 6:
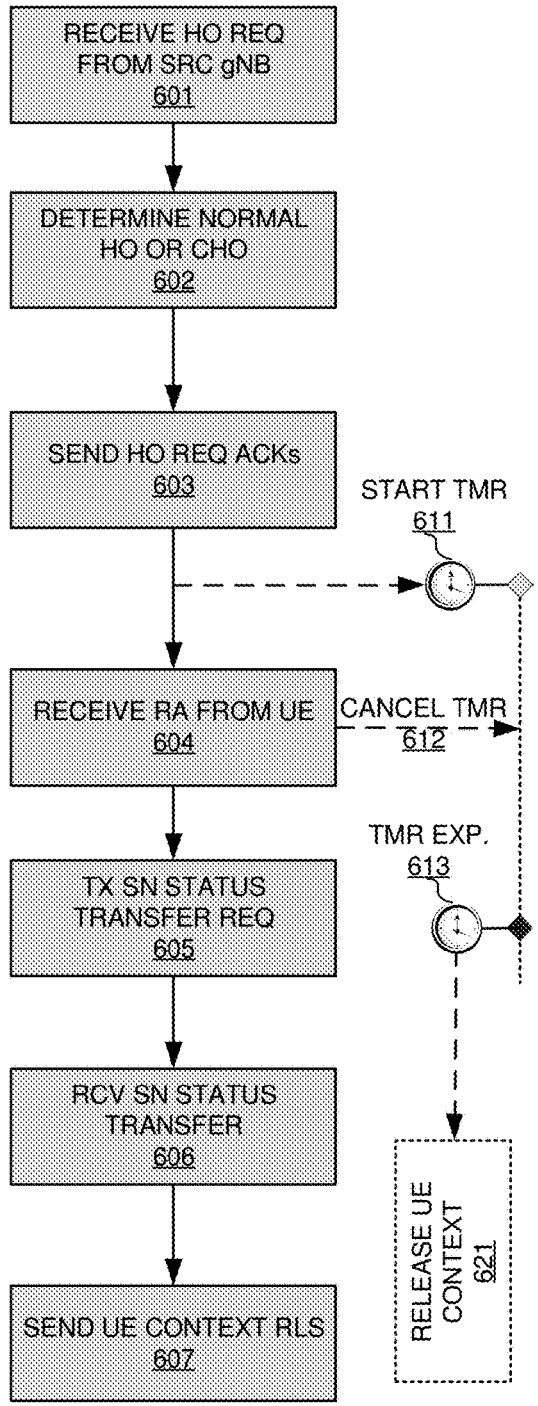
FIG. 6 illustrates exemplary diagrams of conditional handover procedure at the target gNB over Xn interface in accordance with embodiments of the current invention.

FIG. 6 illustrates exemplary diagrams of conditional handover procedure at the target gNB over Xn interface in accordance with embodiments of the current invention. At step 601, the target gNB receives HO request from the source gNB. At step 602, the target gNB determine whether normal HO or conditional HO is requested. At step 603, if conditional HO is performed, the target gNB provides HO request ACK to the source gNB. Furthermore, it provides the information on how long the dedicated resources and UE context will be kept. At step 611, the target gNB starts the target validity timer. At step 604, the target gNB receives RA procedure from the UE and the RRC reconfiguration complete message. At step 612, the target gNB cancels the target validity timer. At step 605, the target gNB requests SN status transfer procedure. In one embodiment, the SN status transfer procedure is initiated by the target gNB; in one embodiment, the target gNB only waits for the source gNB to perform SN status transfer procedure. At step 606, the target gNB receives the SN status transfer message. At step 607, the target gNB sends UE context release message to the source gNB. If the target validity timer expires at step 613 without receiving the RA request from the UE, at step 621, the target gNB releases the UE context.

Figure 7:
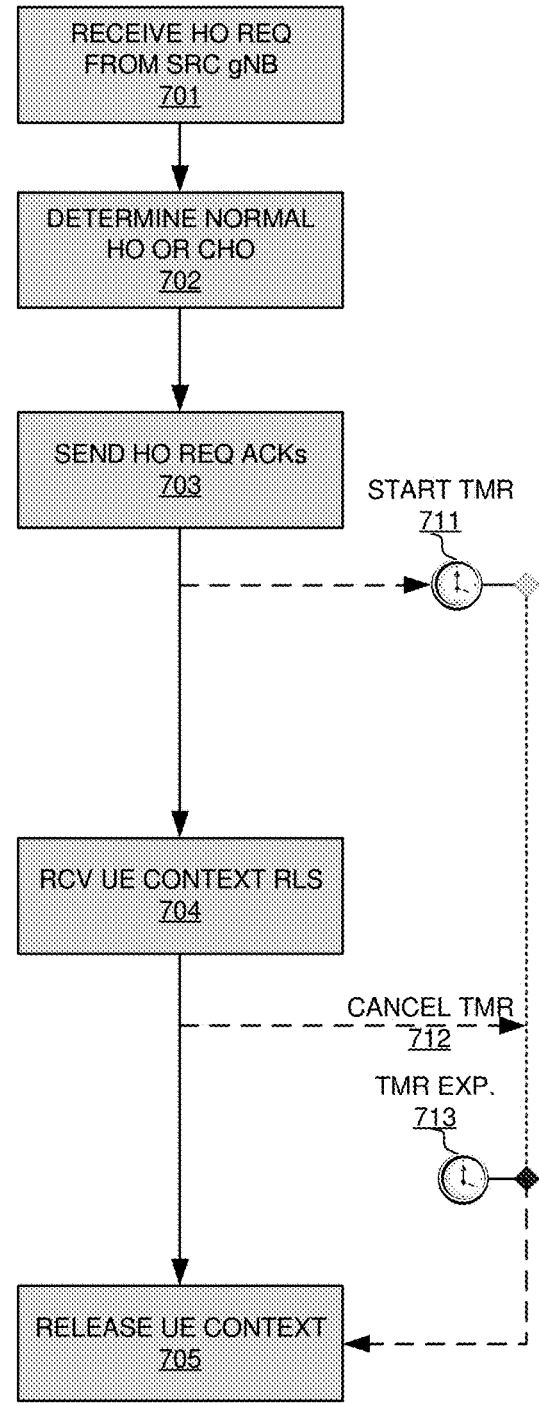
FIG. 7 illustrates exemplary diagrams of conditional handover procedure at the candidate gNB over Xn interface in accordance with embodiments of the current invention.

FIG. 7 illustrates exemplary diagrams of conditional handover procedure at the candidate gNB over Xn interface in accordance with embodiments of the current invention. At step 701, the candidate gNB receives HO request from the source gNB. At step 702, the candidate gNB determine whether normal HO or conditional HO is requested. At step 703, if conditional HO is performed, the candidate gNB provides HO request ACK to the source gNB. Furthermore, it provides the information on how long the dedicated resources and UE context will be kept. Optionally, at step 711, upon sending the HO request ACK, a target validity timer is started at the candidate gNB. At step 704, the candidate gNB receives UE context release message from the source gNB. The candidate cell moves to step 705 to release the UE context. In one embodiment, at step 712, the candidate cell cancels the target validity timer upon receiving the UE context release message. In one embodiment, the candidate gNB release UE context when the timer expires. At step 713, the target validity timer expires and the candidate cell moves to step 705 to release the UE context.

Figure 8:
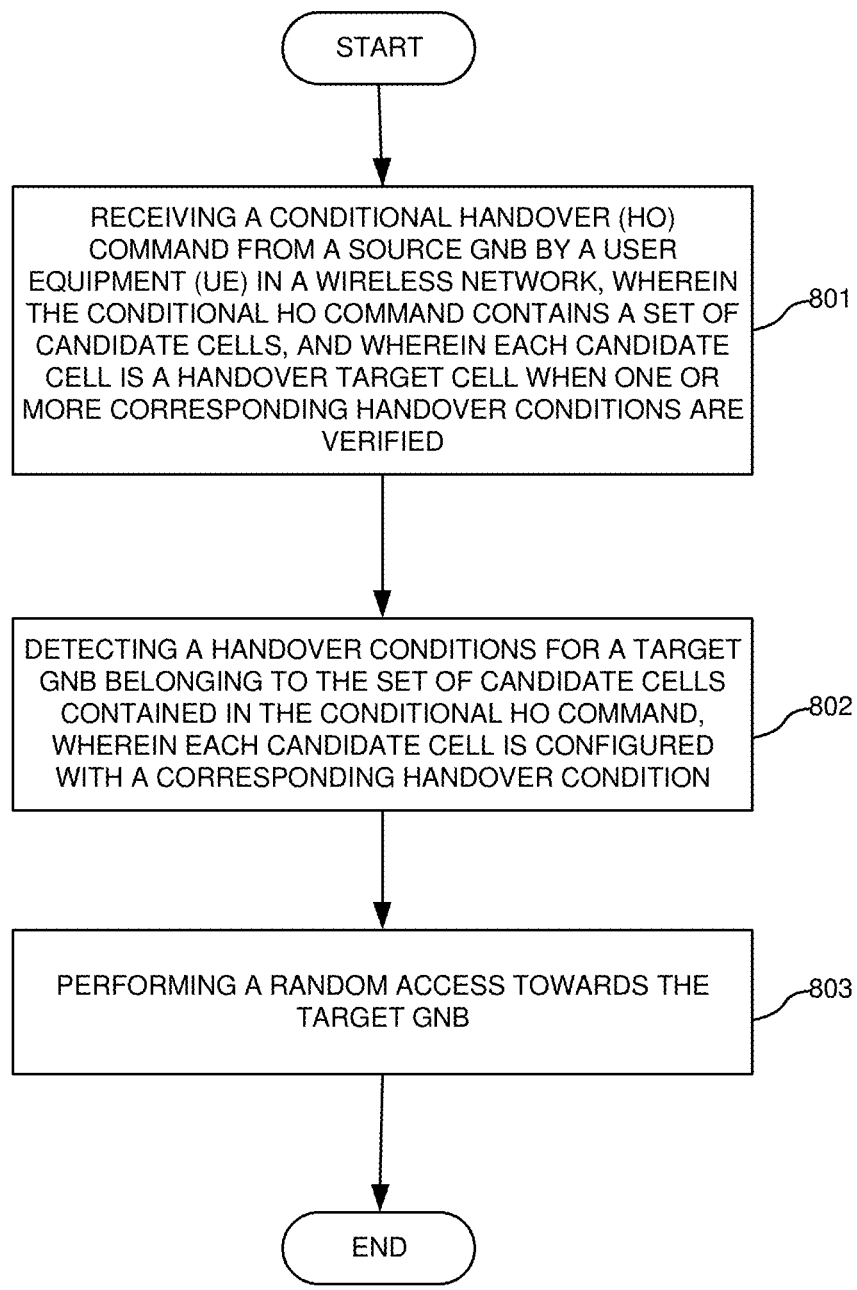
FIG. 8 illustrates an exemplary flow chart for a UE performing the conditional HO procedure in accordance with embodiments of the current invention.

FIG. 8 illustrates an exemplary flow chart for a UE performing the conditional HO procedure in accordance with embodiments of the current invention. At step 801, the UE receives a conditional handover (HO) command from a source gNB in a wireless network, wherein the conditional HO command contains a set of candidate cells, and wherein each candidate cell is a handover target cell when one or more corresponding handover conditions are verified. At step 802, the UE detects a handover conditions for a target gNB belonging to the set of candidate cells contained in the conditional HO command, wherein each candidate cell is configured with a corresponding handover condition. At step 803, the UE performs a random access towards the target gNB.

Figure 9:
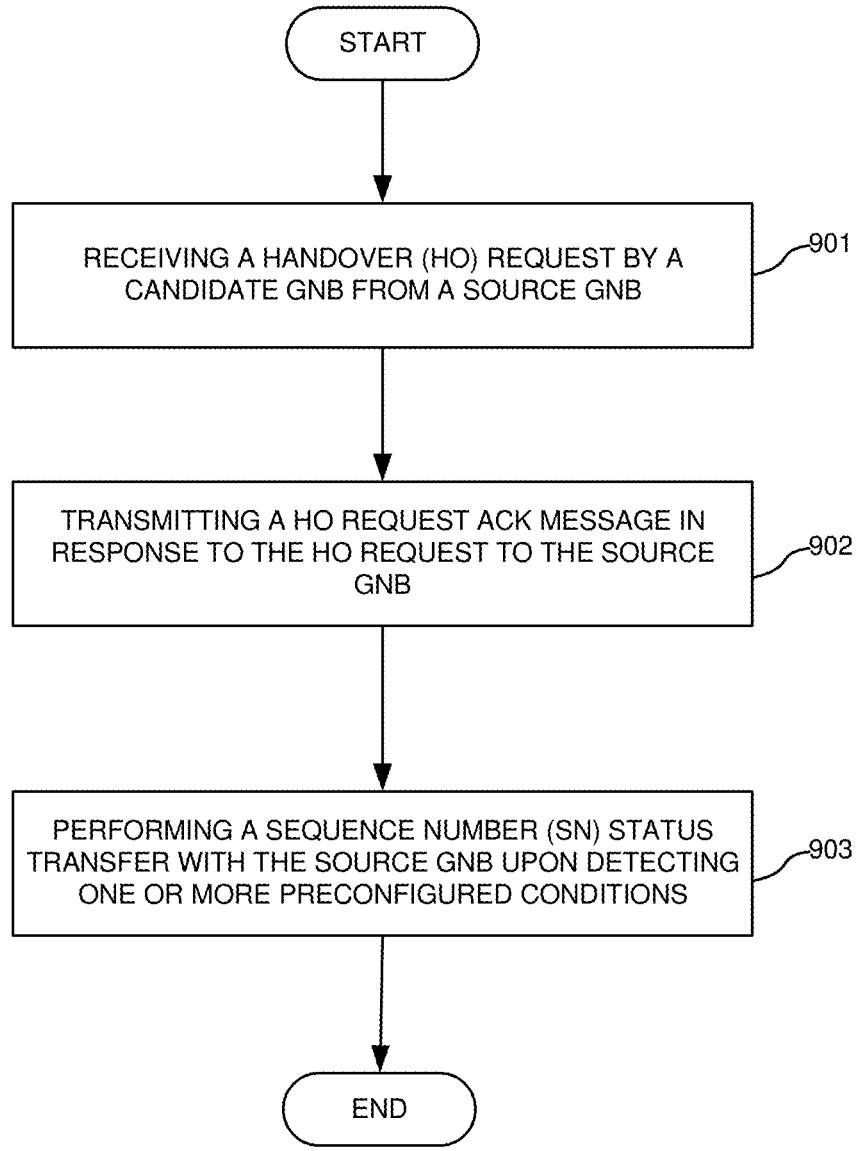
FIG. 9 illustrates an exemplary flow chart for a candidate cell performing the conditional HO procedure in accordance with embodiments of the current invention.

FIG. 9 illustrates an exemplary flow chart for a candidate cell performing the conditional HO procedure in accordance with embodiments of the current invention. At step 901, the gNB receiving a handover request from a source gNB. At step 902, the gNB transmits a HO request ACK message in response to the HO request to the source gNB. At step 903, the gNB performs a SN STATUS TRANSFER with the source gNB upon detecting one or more preconfigured conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    receiving a conditional handover (HO) command from a source g NB by a user equipment (UE) in a wireless network, wherein the conditional HO command contains a set of candidate cells, and wherein each candidate cell is a handover target cell when one or more corresponding handover conditions are verified, and wherein the conditional HO command further includes a candidate cell ID for each candidate cell, a new C-RNTI, one or more security algorithm identifiers for corresponding selected security algorithms for each candidate cell, a set of dedicated random access channel (RACH) resources, an association between RACH resources and synchronization signal blocks (SSBs), an association between RACH resources and UE-specification channel state information reference signal (CSI-RS) configurations, common RACH resources, and candidate cell system information blocks (SIBs);
    detecting one or more handover conditions for candidate cells contained in the conditional HO command identified by corresponding candidate cell ID in the conditional HO command, wherein each candidate cell is configured with one or more corresponding handover conditions; and
    performing a random access towards a target cell using corresponding dedicated RACH resources and SSB for the target cell in the conditional HO command based on corresponding RACH information, and SIB information, and applying corresponding security algorithms for the target cell in the conditional HO command.

2. The method of claim 1, wherein the conditional HO command is carried by a radio resource control (RRC) reconfiguration message.

3. The method of claim 1, wherein upon receiving a RRC reconfiguration message, the UE performs a conditional HO in response to a conditional HO command in the RRC reconfiguration message, the UE performs a normal HO in response to a normal HO command in the RRC reconfiguration message, and the UE performs a reconfiguration in response to a regular RRC reconfiguration message.

4. The method of claim 1, wherein the conditional HO command further configures a validity timer that controls a validity of the one or more handover conditions for each corresponding candidate cell.

5. The method of claim 4, wherein the validity timer is started upon receiving the conditional HO command, the validity timer is stopped upon detecting at least one events comprising a handover condition is met and a normal handover command is received, and the conditional HO command is set to be invalid upon the expiration of the validity timer.

6. The method of claim 1, further comprising transmitting a HO start indication message to the source gNB upon detecting at least one handover condition for a candidate cell is met.

7. The method of claim 6, wherein the HO start indication message further includes a cell identifier of the target cell.

8. The method of claim 6, further comprising receiving a HO start indication response signal from the source gNB.

9. The method of claim 1, further comprising:
    applying a security configuration of the target cell; and
    transmitting an RRC reconfiguration complete message to the target cell.

10. A user equipment (UE), comprising:
    a transceiver that transmits and receives radio frequency (RF) signal in a wireless network;
    a command receiving circuit that receives a conditional handover (HO) command from a source gNB, wherein the conditional HO command contains a set of candidate cells, and wherein each candidate cell is a handover target cell when one or more corresponding handover conditions are verified, and wherein the conditional HO command further includes a candidate cell ID for each candidate cell, a new C-RNTI, one or more security algorithm identifiers for corresponding selected security algorithms for each candidate cell, a set of dedicated random access channel (RACH) resources, an association between RACH resources and synchronization signal blocks (SSBs), an association between RACH resources and UE-specification channel state information reference signal (CSI-RS) configurations, common RACH resources, and candidate cell system information blocks (SIBs);
    a detection circuit that detects one or more handover conditions for candidate cells contained in the conditional HO command identified by corresponding candidate cell ID in the conditional HO command, wherein each candidate cell is configured with one or more corresponding handover conditions; and
    a HO circuit that performs a random access towards a target cell using corresponding dedicated RACH resources and SSB for the target cell in the conditional HO command based on corresponding RACH information, and SIB information, and applying corresponding security algorithms for the target cell in the conditional HO command.

11. The UE of claim 10, wherein the conditional HO command further configures a validity timer that controls a validity of the one or more handover conditions for each corresponding candidate cell.

12. The UE of claim 11, wherein the validity timer is started upon receiving the conditional HO command, the validity timer is stopped upon detecting at least one events comprising a handover condition is met and a normal handover command is received, and the conditional HO command is set to be invalid upon the expiration of the validity timer.

\* \* \* \* \*